March 19, 1968  J. W. ROSENKRANDS  3,373,834
DE DION SUSPENSION WITH TORSIONALLY ACTIVE DEAD AXLE
AND CANTILEVER SPRING ELASTIC MEDIUM
Filed Sept. 15, 1966  2 Sheets-Sheet 1
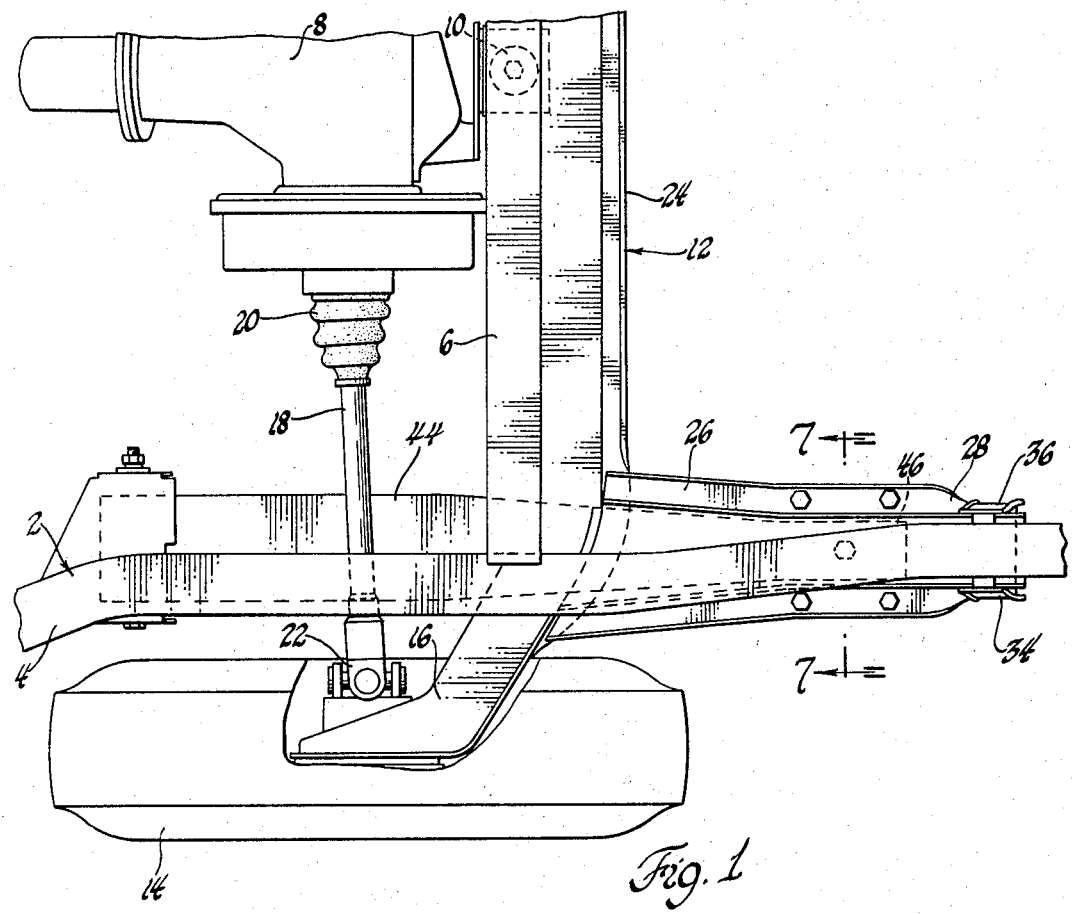
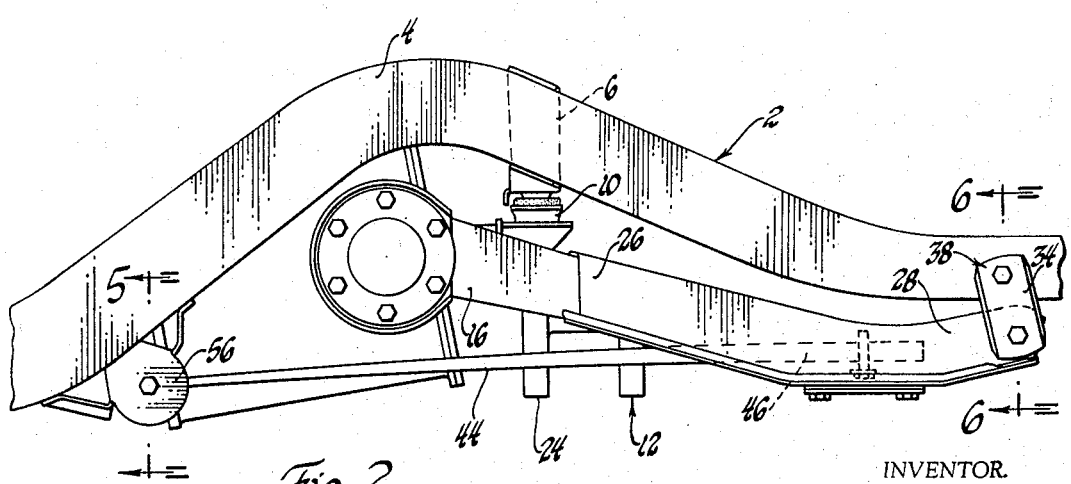
INVENTOR.
John W. Rosenkrands
BY
W. F. Wagner
ATTORNEY

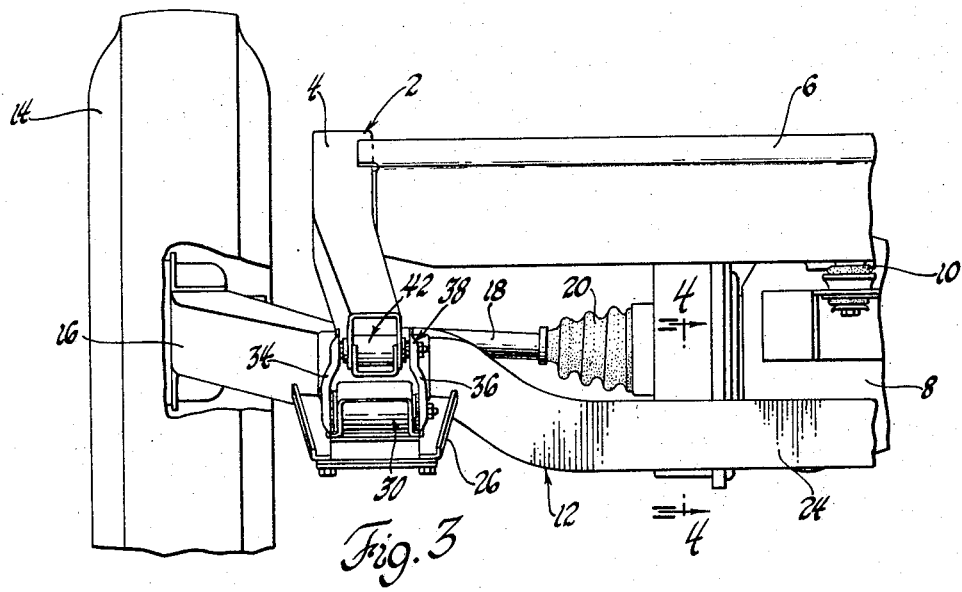
Fig. 3
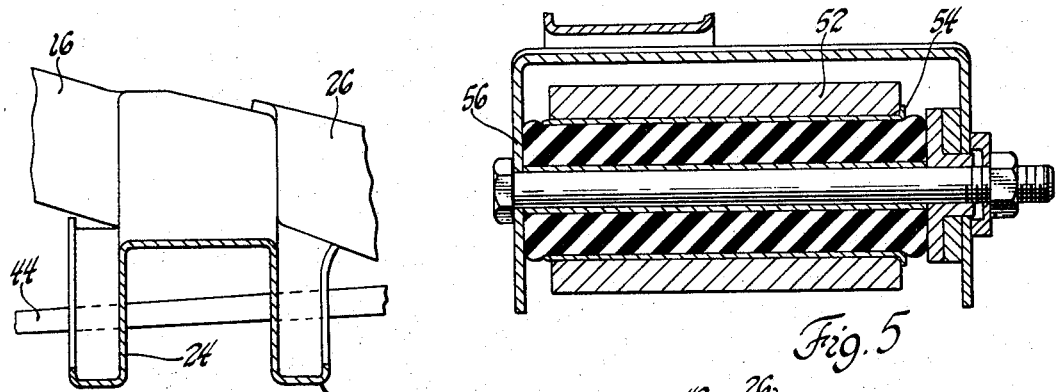
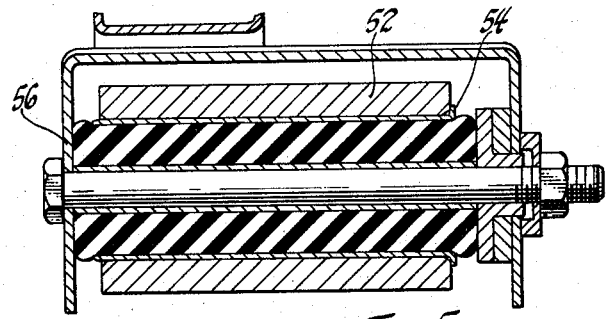
Fig. 4
Fig. 5
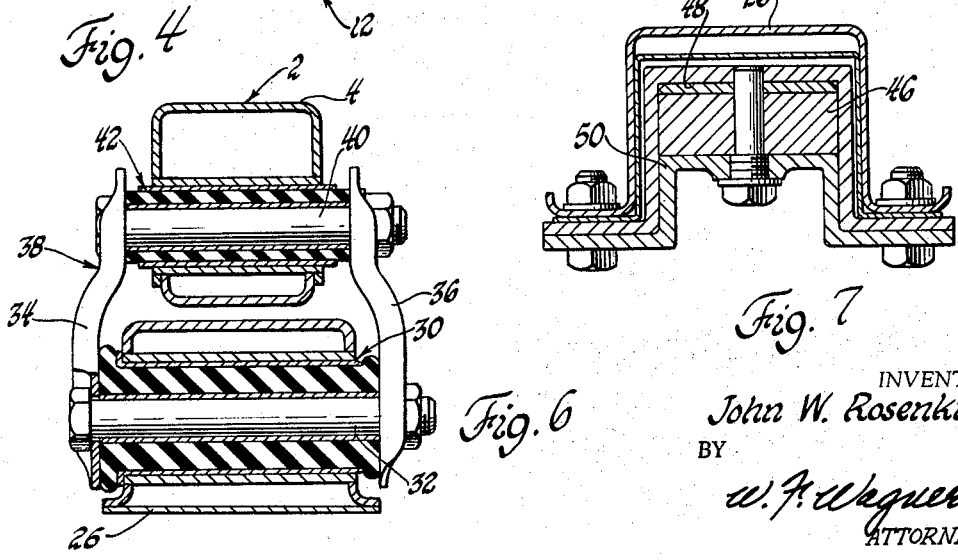
Fig. 6
Fig. 7
INVENTOR.
John W. Rosenkrands
BY
W. F. Wagner
ATTORNEY

United States Patent Office 3,373,834
Patented Mar. 19, 1968

3,373,834
DE DION SUSPENSION WITH TORSIONALLY ACTIVE DEAD AXLE AND CANTILEVER SPRING ELASTIC MEDIUM
John W. Rosenkrands, Detroit, Mich., assignor to General Motors Corporation, Detroit, Mich., a corporation of Delaware
Filed Sept. 15, 1966, Ser. No. 579,619
7 Claims. (Cl. 180—73)

This invention relates to vehicle suspension and more particularly to suspension of the type wherein the driving wheels are maintained in parallel rotating planes by a dead axle.

As is well known, prior art De Dion suspensions characteristically involve a pair of driven road wheels mounted on a rigid dead axle which serves to maintain the wheels in parallelism during both vertical and angular deflection. Since the axle is totally disassociated from the sprung mass, the normal roll deflection tendency of the latter has in the past required control by addition of a conventional torsional roll stabilizer or other additive devices.

The present invention is directed to an improved De Dion suspension in which the dead axle is so formed and arranged as to accomplish its normal function as well as to serve as the medium for controlling roll deflection of the sprung mass.

According to another feature of the invention, a construction is provided which enables utilization of cantilever springs as the elastic medium for supporting the sprung mass in relation to the unsprung mass.

In addition to the foregoing, it is an object of the present invention to provide a De Dion suspension which enables optimum utilization of cantilever leaf springs fabricated from fiberglass reinforced plastic.

These and other objects, advantages and features of the invention will become more readily apparent as reference is had to the accompanying specification and drawings wherein:

FIGURE 1 is a fragmentary plan view illustrating a portion of a De Dion type suspension in accordance with the present invention;

FIGURE 2 is a fragmentary side elevational view of the structure shown in FIGURE 1;

FIGURE 3 is a fragmentary rear end elevation of the structure shown in FIGURES 1 and 2;

FIGURE 4 is a sectional view looking in the direction of arrows 4—4 of FIGURE 3;

FIGURE 5 is a sectioned elevation looking in the direction of arrows 5—5 of FIGURE 2;

FIGURE 6 is a sectioned elevation looking in the direction of arrows 6—6 of FIGURE 2; and FIGURE 7 is a sectioned elevation looking in the direction of arrows 7—7 of FIGURE 1.

Referring now to the drawings and particularly FIGURES 1, 2 and 3, the reference numeral 2 generally designates the vehicle sprung mass which includes a longitudinally extending side rail 4 at each side of the vehicle which side rails are connected by a frame cross member 6. It will be understood that the construction shown in the drawings in reference to the left side of the vehicle corresponds identically to that of the right side of the vehicle, not shown, and accordingly the following detailed description of construction of the left side will be understood to apply equally to the right side of the vehicle. Disposed forwardly and below frame cross member 6 is a differential assembly 8 which is suspended laterally midway thereof by means of elastic mounting 10. Disposed beneath cross frame member 6 rearwardly of differential 8 is a dead axle 12 which extends transversely between spaced apart driving wheels 14 and terminates in forwardly projecting wheel supporting portions 16 upon which wheels 14 are rotatably mounted. Extending transversely oppositely from differential 8 are live axles 18 which operatively connect differential 8 to wheels 14. In accordance with conventional practice, live axles 18 include axially slidable inboard universal joints 20 and outboard universal joints 22 which enable vertical deflection of the wheels 14 in paths dissimilar from the angular inclination assumed by live axles 18.

In accordance with one feature of the invention, the dead axle 12 is so formed as to be essentially rigid with respect to bending tension and compression loads exerted thereon while exhibiting elastic deformation responsive to torsional loads imposed thereon. Thus, the respective wheel supporting portions 16 are capable of opposite vertical angular movement about an imaginary axis passing through the transverse portion 24 of dead axle 12. According to the invention, the torsional deflection capability of the dead axle is utilized to impart resistance to roll deflection of the sprung mass and thus eliminate the need for addition of other roll stabilizing means. As seen best in FIGURES 1 and 2, this is accomplished by providing a pair of rearwardly extending channel section arm portions 26, the forward ends of which are rigidly secured to dead axle 12 at the juncture of wheel supporting portions 16 and the transverse portion 24. At their trailing ends 28, arm portions 26 are provided with elastically buffered cylindrical bushings 30, each of which is in turn mounted on a pivot shaft 32 extending between the lower ends of laterally spaced apart brackets 34 and 36 forming shackle assemblies 38. The upper ends of brackets 34 and 36 in turn are connected to a pivot shaft 40 disposed in an elastically buffered cylindrical bushing 42 supported on frame side rail 2. When mounted in the manner shown, it will be apparent that dead axle 12 and wheels 14 are capable of parallel vertical deflection about the axis defined by the lower pivot shafts 32. Additionally, dead axle 12 and wheels 14 are capable of limited angular deflection about an imaginary axis extending along the longitudinal centerline of the vehicle characteristic of normal compliance with road irregularities, due to the angular elastic deformation permitted by the shackle assemblies. However, with the onset of significant angular deflection of the sprung mass relative to dead axle 12, lever arms 28 act to impose a torsional stress on the transverse portion 24 of the dead axle, the reaction of which tends to resist roll deflection of the sprung mass.

According to another feature of the invention, the trailing arm portions 26 are further utilized to enable the interposition of cantilever leaf springs 44 in positions achieving optimum compactness and operational efficiency. As seen best in FIGURES 1, 2 and 7, the rearward or anchor ends 46 of springs 44 are rigidly secured against the lower wall 48 of arm 26 by a compression clamp 50 located forwardly adjacent the rearward pivotal connection of shackle assembly 38. Springs 44 extend forwardly from their anchored points on arms 26 and at their forward ends are provided with closed loop portions 52. Loop portions 52 in turn surround elastically buffered cylindrical bushings 54 supported on brackets 56 which in turn are mounted on frame side rail 2. In the preferred embodiment, cantilever leaf springs 44 are preferably formed of fiberglass reinforced plastic which possesses a high modulus of elasticity enabling signficantly shorter length than would be the case with conventional steel springs. As a result, the entire suspension structure including the elastic medium is extremely compact in terms of longitudinal space occupied.

While but one embodiment of the invention has been

I claim:

1. In a motor vehicle, a sprung portion, an unsprung portion including driving wheels, a dead axle extending transversely of said vehicle having opposite end portions rotatably supporting said wheels on a common axis of rotation, spaced apart longitudinally extending arm portions formed on said dead axle, shackle means connecting the free ends of said arms on a common axis on said sprung mass, a leaf spring rigidly connected at one end to each arm intermediate its length and extending longitudinally away from said shackles, and pivot means connecting the other end of each spring on a common axis on said sprung mass.

2. The structure set forth in claim 1 wherein the portion of said dead axle between said arm portions is torsionally yieldable responsive to opposite vertical angular deflection of said arms.

3. The structure set forth in claim 2 including a differential suspended on said sprung mass and live axles operatively connecting said differential with said driving wheels.

4. The structure set forth in claim 3 wherein said common axis of rotation is spaced longitudinally forwardly of the major axis of said dead axle.

5. The structure set forth in claim 4 wherein the common axis of said shackles is spaced longitudinally rearwardly of the major axis of said dead axle.

6. The structure set forth in claim 5 wherein the common axis of said pivot means is spaced longitudinally forwardly of said common axis of rotation.

7. The structure set forth in claim 6 wherein said leaf spring is formed of fiberglass reinforced plastic.

No references cited.

A. HARRY LEVY, *Primary Examiner.*